Sept. 24, 1946.  S. C. CARNEY  2,408,294
CATALYTIC CONVERSION OF HYDROCARBONS
Filed Nov. 13, 1943

INVENTOR
S. C. CARNEY
BY Hudson, Young & Yinger
ATTORNEYS

Patented Sept. 24, 1946

2,408,294

UNITED STATES PATENT OFFICE 2,408,294

CATALYTIC CONVERSION OF HYDROCARBONS

Samuel C. Carney, Bartlesville, Okla., assignor to Phillips Petroleum Company, a corporation of Delaware Application November 13, 1943, Serial No. 510,179

9 Claims. (Cl. 260—683.5)

This invention relates to the conversion of hydrocarbons in the presence of a metal halide catalyst. This invention has particular application to the isomerization of normal paraffins to isoparaffins. The invention relates, in its preferred modification, to the isomerization of normal butane to isobutane in the presence of an aluminum halide catalyst.

At the present time, conversion of straight chain paraffins to branched chain paraffins of the same number of carbon atoms per molecule is assuming increasing importance in petroleum refining operations. The isomerization of the normal paraffins to isoparaffins is carried out commercially with varying degrees of success. Aluminum halides, particularly aluminum chloride, are among the most promising catalysts for these reactions. In carrying out isomerization of paraffins in the presence of aluminum chloride the paraffins are contacted in liquid or vapor phase with aluminum chloride in the presence of hydrogen chloride as a promoter. General practice is to use the aluminum chloride in solid form, usually admixed with or deposited on a suitable carrier material. Carrier materials may be coated with aluminum chloride by mechanical mixing, by fusion of the aluminum chloride with the carrier, by impregnating the carrier under pressure with molten aluminum chloride, and by sublimation of aluminum chloride onto the carrier. Alternatively, the aluminum chloride may be used in finely divided form suspended in an inert liquid; in liquid phase, particularly in the form of the double salt of aluminum chloride with other metal chlorides; or in the vapor phase.

Although aluminum chloride is a well known catalyst for a wide variety of reactions other than isomerization, and has long been used as a cracking catalyst, certain problems of operation resulting from the physical and chemical properties of aluminum chloride have never been satisfactorily solved. Aluminum chloride has slight, but definite, solubility in hydrocarbons. It also possesses substantial volatility at the temperatures required for hydrocarbon conversion. Due to the solubility in hydrocarbons some aluminum chloride is carried out of the reactor in liquid effluents. The volatility or vapor pressure of aluminum chloride at conversion temperatures results in contamination of vaporous effluents of the reaction zone. Solid aluminum chloride tends to soften and run together thereby reducing the area of contact surface available and clogging passages between the catalyst supports. Aluminum chloride reacts with certain hydrocarbons, which may be present in the feed stream or formed in the reactor, forming an undesirable liquid sludge of low catalytic activity. The sludge tends to form a coating over the solid aluminum chloride preventing contact with the hydrocarbons. Sludge formation represents a loss of aluminum chloride catalyst. Replenishing the aluminum chloride lost by sludge formation is costly and the sludge itself is a nuisance in that it creates a disposal problem.

The ideal solid catalyst is one which will remain in solid form under the conditions at which the catalyzed reaction takes place so that feed material may be passed in either liquid or vapor phase over an extended surface of the catalyst. The ideal catalyst should be selective in its action, promoting only the desired reaction, and should not react with either the feed stream or the reaction products. From a consideration of the physical, chemical, and catalytic properties of aluminum chloride, it is evident that it is far from ideal as a solid catalyst in spite of its high catalytic activity.

As might be expected, many attempts have been made to devise a mechanical system for carrying out the isomerization process with aluminum chloride which would take into consideration the undesirable physical and chemical properties of this catalyst.

Generally speaking, catalytic operations may be classified in the following groups with respect to the phase relationship of catalyst and reactants.

1. Catalyst and feed in a single liquid phase.
2. Catalyst and feed both in vapor phase.
3. Catalyst in solid phase, feed in liquid or vapor phase.
4. Catalyst in liquid phase, either as such or in solution; feed in vapor phase or in a second liquid phase.
5. Catalyst in vapor phase, feed in liquid phase.

In groups 1 and 2 the catalyst and reactants are in the most intimate contact. Operations falling within either groups 1 and 2 present desirable operating conditions because of the nature of the contact between the catalyst and the reactants. Processes of the type classed in group 1 depend for operation upon complete miscibility of catalyst and reactants. Since vapors are fully miscible, operation of a process in accordance with group 2 may generally be more readily practiced.

The process of the present invention is preferably carried out in operation with catalyst and hydrocarbons in the vapor phase. When operated in this manner the aluminum chloride catalyst is vaporized and admixed with hydrocarbon vapors and hydrogen chloride as promoter. The reaction then takes place in vapor phase. The aluminum chloride vapor is separated from the hydrocarbon vapor by absorption with antimony trichloride. Aluminum chloride vapors are subsequently regenerated by heating the aluminum chloride-antimony trichloride mixture which effects vaporization of aluminum chloride therefrom. The antimony trichloride, in turn, is reused for absorption of aluminum chloride vapors. The mutual solubility of aluminum chloride and antimony trichloride is known. It is also known that antimony trichloride acts as a promoter for aluminum chloride in isomerization of paraffins. The present invention utilizes antimony trichloride in hydrocarbon conversion reactions in a new and useful manner.

The advantages of operating in accordance with the present invention with catalyst and reactants in vapor phase are:

1. Solid aluminum chloride with its attendant disadvantages is not present in the reactor.
2. Perfect contact of catalyst and hydrocarbon while both are in vapor phase is attained in the reactor.
3. Coating of catalyst with sludge is eliminated.
4. The process may be operated continuously without necessity of interruptions to replace catalyst.

An object of this invention is to provide an improved process for the conversion of hydrocarbons in the presence of a metal halide catalyst.

Another object of this invention is to provide an improved process for the isomerization of normal paraffins to isoparaffins.

Still another object of this invention is to provide such a process wherein paraffins are isomerized in the presence of a metallic halide catalyst wherein the catalyst and reactants are in vapor phase.

A further object of this invention is to provide an improved process for the vapor phase isomerization of normal butane to isobutane in the presence of vaporous aluminum chloride as a catalyst.

A still further object of this invention is to provide a process for the separation of aluminum chloride vapors from hydrocarbon vapors by absorption with antimony trichloride.

Further objects and advantages of this invention will be evident from the following detailed description of specific applications of the invention and the accompanying drawing illustrating diagrammatically the described specific embodiments.

Figure 1:
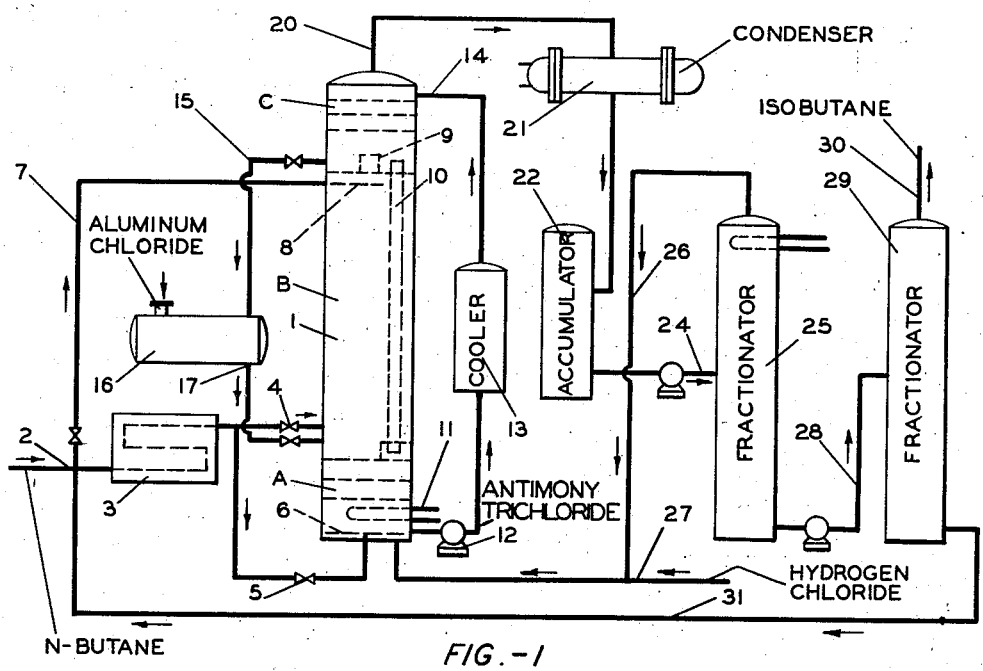
Figure 1 illustrates diagrammatically apparatus suitable for carrying out paraffin isomerization by the process of this invention.

With reference to Fig. 1 of the drawing, the numeral 1 designates a column of suitable size divided into three sections, A, B, and C. Section A constitutes a still in which aluminum chloride is vaporized. Section B is the reaction chamber in which reaction of the hydrocarbon takes place in vapor phase in the presence of aluminum chloride vapors. Section C is an absorber in which aluminum chloride vapors are separated from hydrocarbon vapors. In the preferred modification of this invention the still A, reactor B, and absorber C are parts of the same column as illustrated and described herein. It will be evident to those skilled in the art that these zones may be separated or otherwise arranged while still maintaining the functions of these elements as described herein. Each of sections A, B, and C is of suitable size to effect the desired operation, section B being generally larger than sections A or C to provide the necessary residence time required to allow the reaction to take place to the desired extent.

Hydrocarbon feed, normal butane for isomerization to isobutane, enters through line 2. The major portion of the feed passes to heater 3 wherein the normal butane is heated to the operating temperature, and from which the vapors may be passed through valve 4 into the reaction section B or through valve 5 to the distributor 6 in the lower part of the still A. The normal butane thus introduced contacts vapors of aluminum chloride and hydrogen chloride in vapor phase in the reactor where isomerization of normal butane to isobutane takes place.

The temperature in the reaction zone is above the vaporization temperature of aluminum chloride and below the temperature at which undesirable reactions take place. Aluminum chloride sublimes at a temperature of about 178° C. and has a boiling point of about 183° C. at atmospheric pressure. At 2½ atmospheres pressure the boiling point of aluminum chloride is about 190° C. Accordingly, the temperature in the reaction chamber may be within about 190° C. to about 250° C. Preferably the temperature within the reactor is confined within the limits of about 190° C. to about 220° C. The isomerization of normal butane to isobutane is exothermic, hence there is a tendency for the temperature to increase from the bottom to the top of section B. The temperature in section B may be controlled by injection of normal butane at one or more points along the length of the reaction chamber. The temperature at the top of the reaction chamber B is limited to a value below about 200° C. by the addition of fresh normal butane, preferably in liquid form to take advantage of the heat of vaporization. For this purpose, a part of the normal butane from line 1 is passed through line 7 to a distributor 8 in the reaction chamber B.

Vapors from the reaction chamber, comprising hydrocarbons, hydrogen chloride, aluminum chloride, and antimony trichloride vapors, pass through the chimney 9 into the absorber C. The absorber C is provided with vapor-liquid contact means, as, for example, packing or bubble plates. In the absorber the vapors from the reaction chamber are brought into contact with liquid antimony trichloride. The temperature in the absorption section is preferably within the range of 180° C. to about 200° C. The antimony trichloride absorbs aluminum chloride vapors from the hydrocarbon stream. The mixture of aluminum chloride and antimony trichloride flows from the absorber C through the downspout 10 to the vaporizer or still A. Still A preferably is provided with plates or packing providing vapor-liquid contact means similar to that of the absorber. Heat is supplied to the still by suitable heating means, e. g., steam coil. In the still the aluminum chloride is liberated from the antimony trichloride and passes up into the reactor B. The hydrocarbon vapor supplied to the still from the distributor 6 aids in the vaporization of the aluminum chloride by its stripping action and its effect on the partial pressures in the still. The temperature in the still is maintained within the range of about 180° C. to about 220° C.

Liquid antimony trichloride is drawn from the still and passed by pump 12 to the cooler 13. The cooler 13 may conveniently be cooled by boiling water to obtain a temperature approaching 100° C. In any case the antimony trichloride is not cooled below about 80° C. since it solidifies at 73.4° C. The cooled antimony trichloride is then passed through line 14 to the upper part of the absorber C for further absorption of aluminum chloride vapors, thereby completing its cycle. A part of the stream from the absorber C may be passed via line 15 to a catalyst make-up chamber 16. In chamber 16 fresh aluminum chloride is added, as needed, and passes in solution in the antimony trichloride from the absorber to the still A through line 17.

The hydrocarbon vapors, freed from aluminum chloride vapors, leave the column by line 20 and pass to the condenser 21. Condensate is collected in the accumulator 22 and fed via line 24 to the fractionator 25. The fractionator 25 is provided with suitable refluxing and reboiling means as is customary. Hydrogen chloride is separated from the hydrocarbons and returned to column 1 via line 26. Additional hydrogen chloride may be supplied as needed through line 27. From fractionator 25, the hydrocarbons are passed through line 28 to the fractionator 29 in which the isobutane is separated from unreacted normal butane. The isobutane passes overhead through line 30; normal butane is returned through line 31 to the heater 3 as recycle for conversion to isobutane.

The foregoing detailed description is specific to the isomerization of normal butane to isobutane in the presence of aluminum chloride as catalyst using hydrogen chloride as promoter for the reaction. It is to be understood that in the process of the present invention, normal paraffins other than butane may be employed as feed to the isomerization reaction. The aluminum chloride is promoted by a hydrogen halide, generally hydrogen chloride is employed because of its availability. It is well known that other metal halides catalyze the isomerization reaction and that these catalysts may be promoted by hydrogen halides. Aluminum bromide is known to be a good isomerization catalyst which may be promoted by hydrogen bromide. It is also known to use mixtures of aluminum chloride and aluminum bromide as catalysts for this reaction.

Figure 2:
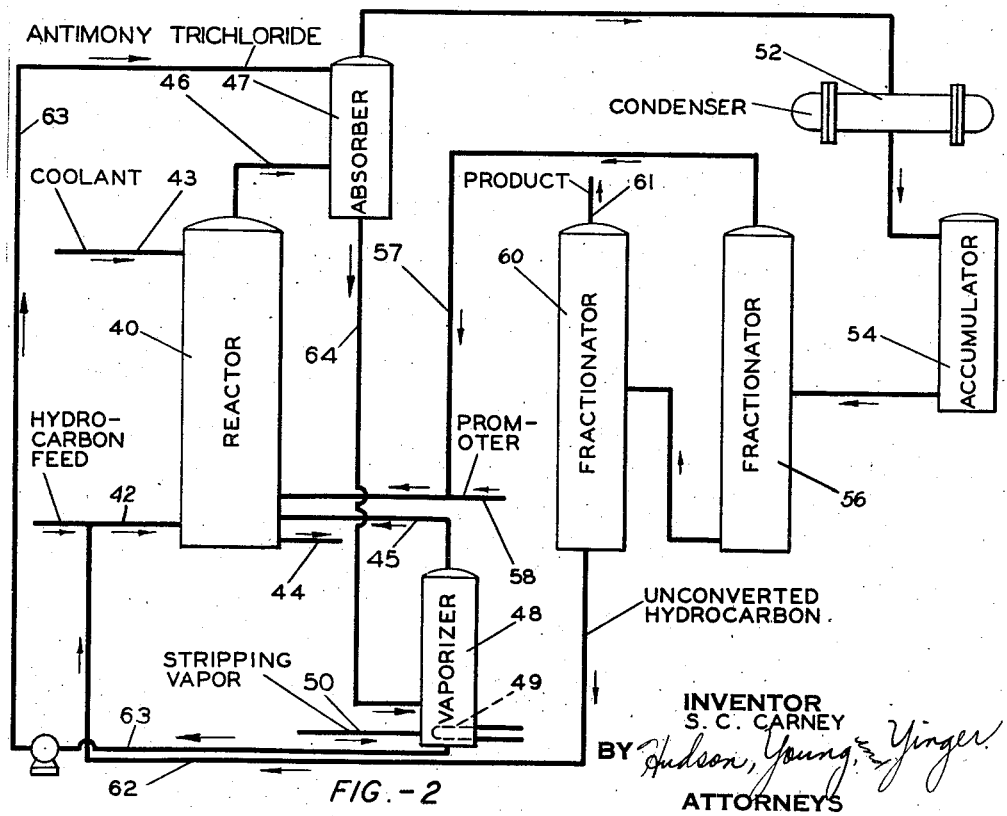
Figure 2 illustrates diagrammatically apparatus suitable for a more general application of the process of the present invention to hydrocarbon conversion.

Figure 2 of the drawing illustrates in a more general way the application of the present invention to hydrocarbon conversion processes in which an aluminum chloride catalyst is used. Cracking, isomerization, or other reaction promoted by aluminum chloride may be carried out in the apparatus illustrated. Reaction takes place in the reactor 40 in the presence of aluminum chloride as catalyst and hydrogen chloride as promoter. The aluminum chloride is preferably present in the reactor in vapor phase; it will be evident, however, that aluminum chloride may be present in the reactor in liquid or vapor phase. The hydrocarbon feed enters the reactor through line 42. A suitable coolant, preferably hydrocarbons, may be added to the reactor through line 43 as desired. The aluminum chloride is charged to the reactor in any convenient manner; it may be admitted through line 42 or line 43 if desired. Liquid hydrocarbons, together with any aluminum chloride sludge which may be formed in the reactor, may be withdrawn through line 44. Vaporized aluminum chloride enters the reactor through line 45 as will be evident from the following description of operation. The hydrocarbons leave the reactor in vapor phase through line 46 at a temperature above about 75° C. and are cooled, if necessary, to a temperature below about 200° C. before entering the absorber 47. The temperature in reactor 40 may be any temperature necessary for carrying out the reaction. The isomerization of normal paraffins to isoparaffins may be conducted at temperatures in the range of about 50° C. to about 250° C.; cracking, generally at temperatures above about 250° C. It will be recognized by those skilled in the art that the composition of the feed and other operating conditions affect the reaction and govern the temperature at which a given reaction is best carried out. The temperature in the reactor is immaterial to the operation of this modification of the present invention, it being essential only that the temperature of the vapors entering the absorber 47 be within the range of about 75° C. to about 200° C.

In the absorber 47, the hydrocarbon vapors containing vaporous aluminum chloride are contacted with liquid antimony trichloride which effects solution of the aluminum chloride vapors. Fresh antimony trichloride may be added to the absorber and saturated antimony trichloride removed from the absorber as required, e. g., in the manner described in connection with Fig. 1 by means of lines 63 and 64, respectively. The absorbed aluminum chloride is subsequently vaporized from the antimony trichloride in the vaporizer 48 and returned to the reactor 40 through line 45. The vaporizer 48 is provided with heating means 49 and means 50 for admitting stripping vapor thereto to effect vaporization of aluminum chloride. It will be evident to one skilled in the art that the absorber and vaporizer may be so constructed as to be interchangeable, each serving alternately as absorber and vaporizer.

Hydrocarbon vapors freed of aluminum chloride are passed from the absorber 47 to the condenser 52. Condensate from the condenser collects in accumulator 54 from which it is passed to the fractionator 56. The promoter is separated from the hydrocarbons and returned to the reactor through line 57; additional promoter may be added as required through line 58. The hydrocarbons are passed from the fractionator 56 to a second fractionator 60 for separation of product from unreacted hydrocarbons. The desired product leaves the fractionator by line 61; unreacted hydrocarbons are returned to the reactor 40 through line 62.

Antimony trichloride is liquid at atmospheric pressure at temperatures within the range of about 74° C. to about 220° C. This liquid is readily transferred from point to point in the system.

While aluminum chloride is solid at temperatures below about 180° C. it should be noted that it has a definite vapor pressure at temperatures below its melting point. The vapor pressures of aluminum chloride at various temperatures are approximately as follows:

| | Mm. Hg |
|---|---|
| 100° C | 1 |
| 120° C | 9 |
| 140° C | 44 |
| 160° C | 234 |
| 170° C | 513 |

In view of the fact that hydrocarbon vapors are present in large quantities in the reactor, it will be readily appreciated that large quantities of aluminum chloride vapors appear in the hydrocarbon vapors even when using solid aluminum chloride at temperatures below the vaporization temperature. The present invention has wide application in the removal of aluminum chloride vapors from hydrocarbon vapors in the effluents of hydrocarbon conversion processes in which aluminum chloride is used as catalyst.

I claim:

1. A process for the conversion of hydrocarbons in a reaction catalyzed by aluminum chloride which comprises contacting the hydrocarbon with aluminum chloride in a reaction zone under conditions such that the desired reaction is effected, passing vaporous effluent from the reaction zone containing hydrocarbon vapors and aluminum chloride vapors into contact with liquid antimony trichloride effecting separation of aluminum chloride vapors from the hydrocarbon vapors by solution in liquid antimony trichloride, subsequently liberating aluminum chloride vapors from liquid antimony trichloride, and returning the aluminum chloride to the reaction zone as catalyst.

2. In a process for conversion of hydrocarbons in a reaction catalyzed by aluminum chloride, the improvement which comprises contacting vaporous effluents of the reaction containing aluminum chloride vapors in admixture with hydrocarbon vapors with liquid antimony trichloride effecting separation of aluminum chloride vapors from the hydrocarbon vapors by solution in liquid antimony trichloride, and subsequently liberating aluminum chloride vapors from liquid antimony trichloride.

3. In a process for the conversion of hydrocarbons in a reaction catalyzed by aluminum chloride, the improvement which consists in contacting vaporous effluents of the reaction containing aluminum chloride vapors and hydrocarbon vapors with liquid antimony trichloride effecting separation of aluminum chloride vapors from the hydrocarbon vapors by solution in liquid antimony trichloride.

4. A process for the conversion of hydrocarbons in a reaction catalyzed by aluminum chloride which comprises contacting the hydrocarbons with aluminum chloride in a reaction zone, passing vaporous effluent from the reaction zone containing aluminum chloride vapors to an absorption zone into contact with liquid antimony trichloride at a temperature in the range of about 75° C. to about 200° C. effecting removal of aluminum chloride from said hydrocarbon vapors by solution in liquid antimony trichloride, passing antimony trichloride containing aluminum chloride in solution therein from the absorption zone to a distillation zone, liberating aluminum chloride from antimony trichloride in the distillation zone by heating to a temperature within the range of about 180° C. to about 220° C., and passing the liberated aluminum chloride vapors from the distillation zone to the reaction zone.

5. The process of isomerizing a normal paraffin to the corresponding isoparaffin which comprises intimately contacting the normal paraffin in vapor phase with volatilized aluminum chloride as a catalyst in the presence of an anhydrous hydrogen halide promoter in a reaction zone substantially free from liquid phase and for a period of time such as to effect isomerization to the isoparaffin, removing the resulting mixture in vapor state from said reaction zone and scrubbing it with molten antimony trichloride in an absorbing zone and thereby dissolving aluminum chloride from said mixture in said molten antimony trichloride while allowing the resulting vaporous mixture of unconverted normal paraffin, isoparaffin and hydrogen halide to pass through undissolved, passing the resulting solution of aluminum chloride in antimony trichloride to a stripping zone and there stripping the dissolved aluminum chloride in vaporous form therefrom, and passing the resulting vaporous aluminum chloride into said reaction zone.

6. A process for the vapor-phase isomerization of normal paraffins to isoparaffins in the presence of aluminum chloride which comprises contacting vapors of a normal paraffin with aluminum chloride vapors in the presence of hydrogen chloride at a temperature within the range of about 190° C. to about 250° C. in a reaction zone in the absence of liquid phase; passing vaporous effluent of said reaction zone containing vapors of aluminum chloride, hydrogen chloride, normal paraffin and isoparaffin into intimate contact with molten antimony trichloride at a temperature within the range of about 180° C. to about 200° C. in an absorption zone thereby dissolving aluminum chloride from said vapors while allowing the hydrogen chloride, normal paraffin and isoparaffin vapors to pass through undissolved; passing the resulting solution of aluminum chloride in antimony trichloride to a distillation zone and liberating the aluminum chloride from the antimony trichloride in said zone at a temperature within the range of about 180° C. to about 220° C. in the presence of hydrocarbon vapors as stripping medium; and passing aluminum chloride vapors from the distillation zone to said reaction zone.

7. The process of claim 6 in which said normal paraffin is normal butane and said isoparaffin is isobutane.

8. A process for isomerization of normal paraffins to isoparaffins which comprises contacting said normal paraffin with aluminum chloride in a reaction zone in the presence of hydrogen halide and at a temperature within the range of about 50° C. to about 250° C. effecting isomerization of normal paraffin to isoparaffin, passing vaporous effluent of said reaction zone to an absorption zone into intimate contact with liquid antimony trichloride at a temperature within the range of about 75° C. to about 200° C. effecting selective solution of aluminum chloride vapors contained therein, passing the solution of aluminum chloride in antimony trichloride to a distillation zone and vaporizing aluminum chloride from antimony trichloride in said zone at a temperature in the range of about 180° C. to about 220° C.; and passing aluminum chloride thus liberated in the distillation zone to the reaction zone.

9. A process for the vapor-phase isomerization of normal butane to isobutane which comprises passing vaporous normal butane into a body of liquid antimony trichloride having aluminum chloride dissolved therein and maintained at a temperature adequate to vaporize said aluminum chloride therefrom, passing resulting vapors of normal butane and aluminum chloride upwardly into and through a separate reaction zone disposed above said body of liquid and maintained at isomerization conditions of temperature and pressure and substantially free from liquid phase, said reaction zone being of sufficient size to effect substantial vapor-phase isomerization therein, passing resulting vapors of normal butane, isobutane and aluminum chloride upwardly into and through a separate scrubbing zone disposed above said reaction zone, contacting the last-mentioned vapors in said scrubbing zone with liquid antimony trichloride to dissolve substantially all of the $AlCl_3$ from said vapors, recovering from said scrubbing zone vapors comprising isobutane substantially free from aluminum chloride, flowing resulting solution of aluminum chloride in liquid antimony trichloride by gravity to said body of liquid antimony trichloride through a path separate from said reaction zone, and passing liquid antimony trichloride from said body of liquid antimony trichloride to said scrubbing zone for use therein to dissolve aluminum chloride from normal butane and isobutane vapors.

SAMUEL C. CARNEY.